United States Patent [19]

Stevens

[11] Patent Number: 4,895,662
[45] Date of Patent: Jan. 23, 1990

[54] PURIFICATION OF EFFLUENT FROM WOOD PULP BLEACH PLANT

[75] Inventor: Rex R. Stevens, Midland, Mich.

[73] Assignee: The Dow Chemical Company, Midland, Mich.

[21] Appl. No.: 351,342

[22] Filed: May 15, 1989

Related U.S. Application Data

[63] Continuation-in-part of Ser. No. 323,242, Mar. 13, 1989, abandoned, which is a continuation of Ser. No. 200,337, May 31, 1988, abandoned.

[51] Int. Cl.[4] ............................................. B01D 15/00
[52] U.S. Cl. .................................... 210/692; 210/917; 210/928
[58] Field of Search ........................ 210/692, 917, 928

[56] References Cited

U.S. PATENT DOCUMENTS

| | | | |
|---|---|---|---|
| 3,652,407 | 3/1972 | Paleos | 210/917 |
| 3,990,969 | 11/1976 | Broddevall | 210/692 |
| 4,191,813 | 3/1980 | Reed et al. | 521/31 |
| 4,263,407 | 4/1981 | Reed, Jr. | 521/33 |
| 4,321,331 | 3/1982 | Widiger et al. | 521/31 |
| 4,382,124 | 3/1983 | Meitzner et al. | 521/38 |

FOREIGN PATENT DOCUMENTS

| | | |
|---|---|---|
| 203556 | 10/1983 | German Democratic Rep. |
| 220964A1 | 4/1985 | German Democratic Rep. |
| 220965A1 | 4/1985 | German Democratic Rep. |
| 229992A1 | 11/1985 | German Democratic Rep. |
| 249703A1 | 9/1986 | German Democratic Rep. |
| 249190A1 | 9/1987 | German Democratic Rep. |
| 249193A1 | 9/1987 | German Democratic Rep. |
| 249194A1 | 9/1987 | German Democratic Rep. |
| 249274A1 | 9/1987 | German Democratic Rep. |

OTHER PUBLICATIONS

R. e. Anderson, "Purification of Kraft Pulp Bleach Plant Effluents Using Condensate Resins", *Reactive Polymers*, 1 (1982) 67–71.
Research and Development Division Conference, 1982, Tappi Press, Kringstad et al. pp. 191–200.

Primary Examiner—Ivars Cintins

[57] ABSTRACT

A process for purifying a waste effluent from the bleaching of wood pulp by contacting the effluent with an adsorbent resin, wherein the adsorbent resin is a macroporous copolymer being post-crosslinked in a swollen state in the presence of a Friedel-Crafts catalyst and functionalized with hydrophilic groups prior to contact with the waste effluent.

22 Claims, 2 Drawing Sheets

PURIFICATION OF EFFLUENT FROM WOOD PULP BLEACH PLANT

CROSS-REFERENCE TO RELATED APPLICATION

This is a continuation-in-part of copending U.S. application Ser. No. 323,242, filed Mar. 13, 1989, which is a continuation of copending, U.S. application Ser. No. 200,337, filed May 31, 1988, both now abandoned.

BACKGROUND OF THE INVENTION

This invention relates to a process for purifying wastewater effluent from a wood pulp bleach plant.

The bleaching of wood pulp is necessary to prepare white paper products. Unfortunately, the bleaching process produces a wastewater effluent which contains high levels of color and chlorinated organic compounds.

The wastewater effluent is typically dumped into rivers and lakes. If the effluent is not treated to remove color, the natural color of the river or lake can be adversely affected. If the effluent is not treated to remove chlorinated organics, aquatic life may be destroyed because these compounds are often toxic.

In many instances, the effluent is purified using conventional wastewater treatment. For example, primary treatment can be used to remove a substantial quantity of solid contaminants and secondary and tertiary treatments can be used to remove various organic compounds, particularly nitrogenqus compounds. Unfortunately, conventional methods are not only expensive but also inefficient at removing many of the compounds that are toxic and affect color.

Anderson et al., *Reactive Polymers*, 1 (1982) pp. 67–71, disclose using a macroporous phenolic resin with weakly basic polyamine functionality to purify the wastewater effluent. Unfortunately, the resin is subject to fouling and breakage because of its poor physical stability.

In view of the deficiencies of prior methods, an inexpensive and fficient means is needed for purifying the wastewater effluent from a wood pulp bleach plant.

SUMMARY OF THE INVENTION

The invention is a process for purifying a waste effluent from the bleaching of wood pulp. The process comprises the step of contacting the effluent with an adsorbent resin, wherein the adsorbent resin is derived from a macroporous copolymer of a monovinyl aromatic monomer and a crosslinking monomer. To achieve the required adsorptive capacity, physical stability and regeneration capabilities, the macroporous copolymer is post-crosslinked in a swollen state in the presence of a Friedel-Crafts catalyst and functionalized with hydrophilic groups.

The process provides an inexpensive and effective means for purifying a waste effluent with a modified macroporous copolymer. The copolymer adsorbs color bodies and chlorinated organic compounds from the effluent stream.

The post-crosslinking of the macroporous copolymer in a swollen state increases the surface area of the copolymer, increases porosity, reduces average pore size, reduces shrink/swell, and imparts rigidity to the copolymer structure. In addition, after functionalization, the resin has hydrophilic characteristics. Because of reduced shrink/swell, increased rigidity of the resin structure, and other properties derived from post-crosslinking, the adsorbent resin can be easily regenerated.

DETAILED DESCRIPTION OF THE INVENTION

Figure 1:
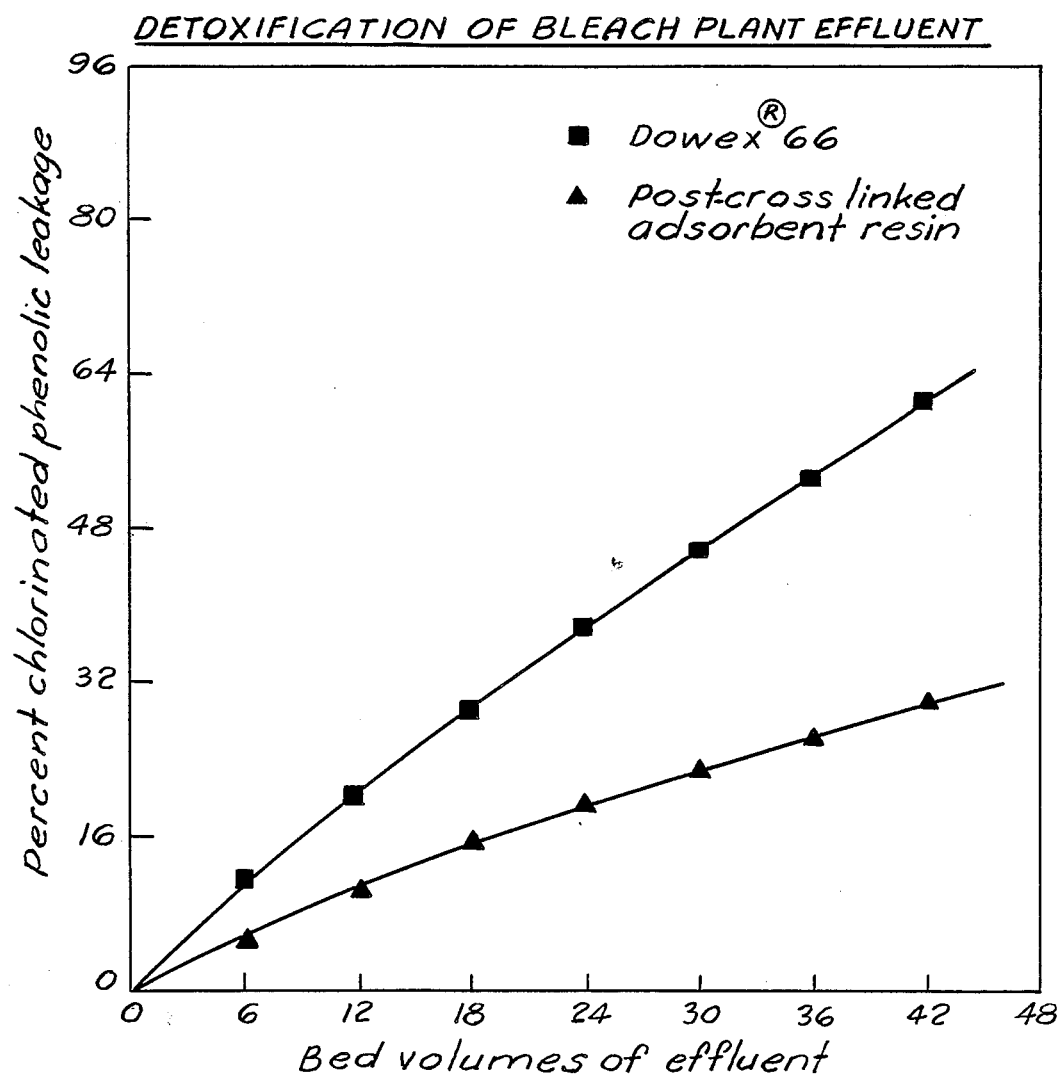
FIG. 1 is a graph illustrating the capacity of an adsorbent resin within the scope of this invention for detoxifying a waste effluent from a pulp mill bleach plant relative to the capacity of a conventional anion-exchange resin.

This invention is a process for purifying a waste effluent from the bleaching of wood pulp by contacting the effluent with an effective amount of an adsorbent resin for a time period sufficient to remove undesirable compounds. The adsorbent resin is a macroporous copolymer that is post-crosslinked in a swollen state in the presence of a Friedel-Crafts catalyst and functionalized with hydrophilic groups. For purposes of describing this invention, a macroporous copolymer is broadly defined to include copolymers prepared by suspension polymerizing, a monomer composition, under conditions conventionally used to prepare ion exchange resins, in the presence of one or moe porogenic diluents. Porogenic diluents could include alkanols with a carbon content from 4 to about 10; higher saturated aliphatic liquid hydrocarbons such as heptane and isoctane; and aromatic solvents such as ethylene dichloride and methylene chloride.

For purposes of describing this invention, the waste effluent is an effluent containing a contaminating amount of color bodies or chlorinated organic compounds. "Purifying" the waste effluent means decolorizing or detoxifying the effluent to the extent necessary or desired.

The term "detoxifying" refers to removing chlorinated organic compounds, particularly chlorinated phenols and chlorinated guaiacols, from the effluent.

A typical waste effluent from the bleaching of wood pulp may contain the numerous compounds identified in Kringstad et al., 1982 *Tappi Research and Development Division Conference*, pp. 191–200, which is incorporated by reference herrein. These compounds include acidic compounds, particularly carboxylic acids and chlorinated carboxylic acids; phenolic compounds such as chlorinated phenols, chlorinated guaicols and polyphenolics; chlorinated aliphatic compounds, and terpenes.

In preparing these adsorbent resins, a macroporous copolymer is contacted with a swelling slvent such as ethylene dichloride. The copolymer's structure is characterized by the presence of regions of densely packed polymer chains separated by pores, often referred to as mesopores (50 to 200 Å) and macropores (>200 Å). The nonuniformity of the internal structure of a swollen macroporous copolymer causes the copolymer to appear opaque because of its ability to refract light. If inert diluents or swelling solvents are removed from the macroporous copolymer, for example by subjecting the copolymer to vacuum or steam distillation, then in many instances the pores will collapse from the stress of internal pressures created by increased attractive forces among the regions of packed polymer chains, and the copolymer would then appear transparent or translucent.

A class of macroporous copolymers has been developed which retain their porous structure even upon removal of inert diluents or swelling solvents. Such macroporous copolymers are refered to as "macroreticular" copolymers and are described in U.S. Pat. No. 4,382,124. They are characterized by their opaque appearance, regardless of whether the copolymer is examined in the presence or absence of inert diluents or swelling solvents.

Processes for preparing macroreticular copolymers of a monovinyl aromatic monomer and a crosslinking monomer, which have been post-crosslinked in a swollen state in the presence of a Friedel-Crafts catalyst, are disclosed in U.S. Pat. Nos. 4,191,813 and 4,263,407, herein incorporated by reference. Such macroreticular copolymers are referred to as "macronet polymeric adsorbents". A macronet polymeric adsorbent can be functionalized with hydrophilic groups using conventional methods for functionalizing copolymers which are prepared via suspension polymerization with ion exchange groups. For example, the polymeric adsorbent can be functionalized by aminating a chloromethylated polymeric adsorbent with either dimethylamine, trimethylamine or dimethylethanolamine depending on whether weak-base or strong-base functionality is desired. Similarly, the macronet polymeric adsorbent can be functionalized by sulfonation. Alternatively, a chloromethylated polymeric adsorbent can be functionalized by solvolysis at elevated temperatures.

The most preferred process for preparing macroporous copolymers which have been post-crosslinked in a swollen state in the presence of a Friedel-Crafts catalyst is described in East German Patent DD 249,274 A1, herein incorporated by reference. This patent describes post-crosslinking a "solvent-free", chloromethylated macroporous copolymer of styrene and divinylbenzene. After chloromethylation, the copolymer is first contacted with a washing agent, such as methanol, and then the washing agent is removed by either drying the washed copolymer or extracting the washing agent with the swelling solvent used for the subsequent post-crosslinking reaction. After post-crosslinking the chloromethylated copolymer, the copolymer can be functionalized with hydrophilic groups in the conventional manner, thereby producing a useful absorbent resin. If it is desirable, functionalization could also be performed before post-crosslinking the copolymer.

Although the East German patent only describes a process for preparing adsorbent resins of styrene and divinylbenzene, the process can be used to prepare other macroporous copolymers of a monovinyl aromatic monomer and a crosslinking monomer which can be used to purify a waste effluent from the bleaching of wood pulp.

Regardless of the method used for functionalizing the post-crosslinked macroporous copolymer, after functionalization, the adsorbent resin's hydrophilic character increases its efficiency to adsorb color bodies and chorinated organic compounds from the wastewater effluent of a wood pulp bleach plant and to desorb these compounds from the resin with an aqueous base or an organic solvent, such as ethanol. Preferably, the macroporous copolymer is functionalized by first chloromethylating the copolymer, post-crosslinking the copolymer and then aminating the chloromethylated copolymer with dimethylamine, trimethylamine or dimethylethanolamine. The most preferred macroporous copolymer is functionalized by aminating the chloromethylated copolymer with dimethylamine. Using conventional ion exchange terminology, an adsorbent resin functionalized in this manner and then contacted with an acidic solution is thus converted to its acid form, which is the preferred form for purifying the wastewater effluent.

Preferred monovinyl aromatic monomers are styrene and its derivatives, such as $\alpha$-methylstyrene and vinyl toluene; vinyl naphthalene; and vinylbenzyl chloride. Crosslinking monomers broadly encompass the polyvinylidene compounds listed in U.S. Pat. No. 4,382,124. Preferred crosslinking monomers are divinylbenzene (commercially available divinylbenzene containing less than about 45 weight percent ethylvinylbenzene), trivinylbenzene, and ethylene glycol diacrylate.

The preferred macroporous copolymer is a copolymer of up to about 99.75 weight percent styrene with the balance divinylbenzene. Another preferred macroporous copolymer is a copolymer from about 40 to about 60 weight percent styrene, from about 40 to about 60 weight percent vinylbenzyl chloride and from about 1 to about 20 weight percent divinylbenzene. The macroporous copolymers may contain minor amounts of other monomers, such as the esters of acrylic and methacrylic acid, and acrylonitrile.

The crosslinker serves to increase the physical stability of the adsorbent resin. The amount of crosslinker required depends significantly on the process conditions used to prepare the copolymer and can range anywhere from about 1 to about 45 percent by weight of total monomer, preferably from about 4 to about 8 percent by weight.

Post-croslinking in a swollen state displaces and rearranges polymer chains, causing an increase in the number of micropores (<50 Å diameter) and mesopores. This increases porosity and surface area and decreases average pore size. Just as significantly, post-crosslinking also imparts rigidity to the polymer, which reduces its tendency to shrink or swell upon contact with an aqueous slution (often referred to in the ion exchange art as the "shrink/swell") and reduces its dry weight capacity when functinalized, which is an indication of its ion exchange capacity. These properties as characterized above increase the capacity of the adsorbent resin to adsorb color bodies and chlorinated organics, increase its permeability to the wastewater effluent, and increase its physical and dimensional stability.

Furthermore, the reduced shrink/swell and dry weight capacity of the adsorbent resin which post-crosslinking induces is conductive to simple, inexpensive and efficient regeneration once color bodies and chlorinated organics are loaded onto the resin. The reduced dry weight capacity allows desorption of these compounds from the loaded resin with a dilute base. Concentrated bases or acids are unnecessary for regeneration or cleaning. The reduced shrink/swell property allows the resin to maintain sufficient porosity to prevent entrapment of color bodies and chlorinated organics, and this property in combination with the reduced dry weight capacity, reduces the tendency of the resin to retain these compounds during regeneration.

The amount of post-crosslinking required for any given application is an amounteffective to achieve the adsorbent resin properties described above to the extent desired.

The adsorbent resin preferably has a surface area from about 150 to about 2100 square meters per gram ($m^2/g$) of dry adsorbent resin, more preferably about 700 to about 1400 $m^2/g$. Surface area is measured by BET nitrogen adsorption techniques. Porosity ranges from about 0.10 to about 0.70 cubic centimeters of pore volume per cubic centimeter (cc/cc) of resin, preferably about 0.43 to about 0.58 cc/cc, as calculated from BET nitrogen adsorption techniques. The porosity contributed by micropores ranges from about 30 to 100 percent, preferably rom about 30 to about 50 percent, depending on the resin characteristics. Percent shrink/swell ranges below about 15 percent, more preferably below about 7 percent, and most preferably below about 4 percent. Percent shrink/swell is determined by measuring the volume expansion or contraction of the absorbent resin when subjected to hydration or a change in ionic form. The dry weight capacity, determined according to conentional methods used for characterizing ion exchange resins, ranges from about 0.1 to about 4.0 milliequivalent per gram (meq/g), preferably from about 0.3 to about 2.0 meq/g. If the macroporous copolymer is functionalized by solvolysis, for example by contact with water or an alcohol, then the dry weight capacity is essentially zero.

The adsorbent resin can be used in the form of beads, pellets or any other form desirable for purifying the wastewater effluent. If the adsorbent resin is used in the form of beads, bead size ranges from about 10 to about 1000 microns ($\mu$), preferably from about 100 to about 800$\mu$, and more preferably from about 300 to about 800$\mu$.

The adsorbent resin and the waste effluent may be contacted using conventional methods which result in intimate contact between the resin and the effluent. Suitable methods include fluidized beds, stirred tanks, batch tanks, and cocurrent and countercurrent flow columns. The contacting may occur batchwise, semi-batchwise, semi-continuously or continuously. Preferably, the effluent is contacted with the resin continuously in a packed column.

The residence time required for contact between the adsorbent resin and the waste effluent depends on the properties of the resin, amount of contaminants present initially, level of purification desired, amount of resin used, viscosity, temperature, and pH. Preferably, the residence time ranges from about 0.1 hours (10 bed volumes/hr) to about 10 hours (0.1 bed volumes/hr), more preferably from about 0.12 hours (8 bed volumes/hr) to about 1 hour (1 bed volume/hr), and most preferably from about 0.17 hours (6 bed volumes/hr) to about 0.5 hours (2 bed volumes/hr).

The adsorbent resin will typically be more effective at temperatures greaterthan 50° C. Generally, temperatures ranging from about 20° C. to about 80° C. are operable. Preferably, the temperature ranges between about 40° C. and about 60° C.

The amount of the adsorbent resin required largely depends on equipment configuration, the level and type of contaminants present, and the level of purification desired. An effective amount required can be readily determined empirically. Suitable amounts of resin can range from about 1 to about 0.005 kilograms of resin per kilogram of effluent (kg/kg), preferably from about 0.3 to about 0.007 kg/kg, more preferably from about 0.017 to about 0.008 kg/kg.

The pH of the waste effluent is preferably maintained at a level which allos for the optimum adsorption of chlorinated organics and color bodies by the adsorbent resin. The pH of the waste effluent prior to purification depends on previous processing steps. It is desirable to conact the resin and the effluent at a pH ranging from about 1 to about 7, preferably about 3 to about 6, and more preferably about 4 to about 5.

After the resin has been loaded with contaminants, the resin can be regenerated using known techniques. For example, the resin can be regenerated by first contacting the resin with an aqueous solution of sodium chloride and either an alkali metal or alkaline earth metal hydroxide (required to convert the adsorbent resin to hydroxide ion form or free-base form) and then contacting the resin with an aqueous solution of either sodium chloride of hydrochloric acid (required to convert the resin to desired hydrochloric acid form for subsequent purification of waste effluent).

The following example illustrates but does not limit the scope of this invention.

EXAMPLE

A 200-gram (g) sample of dried, macroporous, chloromethylated styrene-divinylbenzene (6 weight percent divinylbenzene) copolymer beads and 800 milliliters (nl) of ethylene dichloride is placed in a 2-liter, 3-necked flask equipped with a stirrer, reflux condenser connected to a caustic scrubber, thermometer and recirculating hot water heating system. The slurry is heated to 85° C. to distill off residual moisture. The slurry is then cooled to 25° C. 12 Grams of $AlCl_3$ is added to the flask and the reaction mixture is heated to 83° C. for 5 hours. After cooling the reaction mixture to 25° C., 100 ml of water is added to quench the $AlCl_3$. The reaction mixture is filtered to separate the post-crosslinked macroporous copolymer. The copolymer is then washed with excess methanol and excess water.

The washed copolymer is functionalized in a 1-liter par reactor with 100 g of 40 percent dimethylamine, 50 g of 50 percent aqueous NaOH and 100 g of water. The reactor is sealed and heated to 90° C. for 5 hours with agitation. After cooling, the reaction mixture is filtered. The adsorbent resin is washed with water, placed in one liter of 5 percent HCl and stirred for one hour. The acidified adsorbent resin is filtered, washed with water and placed in one liter of 5 percent NaOH. After stirring for one hour the resin is backwashed with deionized water until the effluent is neutral (pH approximately 7). The free-base form of the adsorbent resin has the properties reported in Table I.

TABLE I

| Properties of Adsorbent Resin | |
|---|---|
| Dry Weight Capacity, meq/g | 1.2 |
| Water Retention Capacity | 52 |
| Porosity, cc/cc | 0.49 |
| Surface Area, $m^2/g$ | 1300 |
| Average Pore Diameter, Å | 18 |
| Percent Shrink/Swell | 1.2 |

Figure 2:
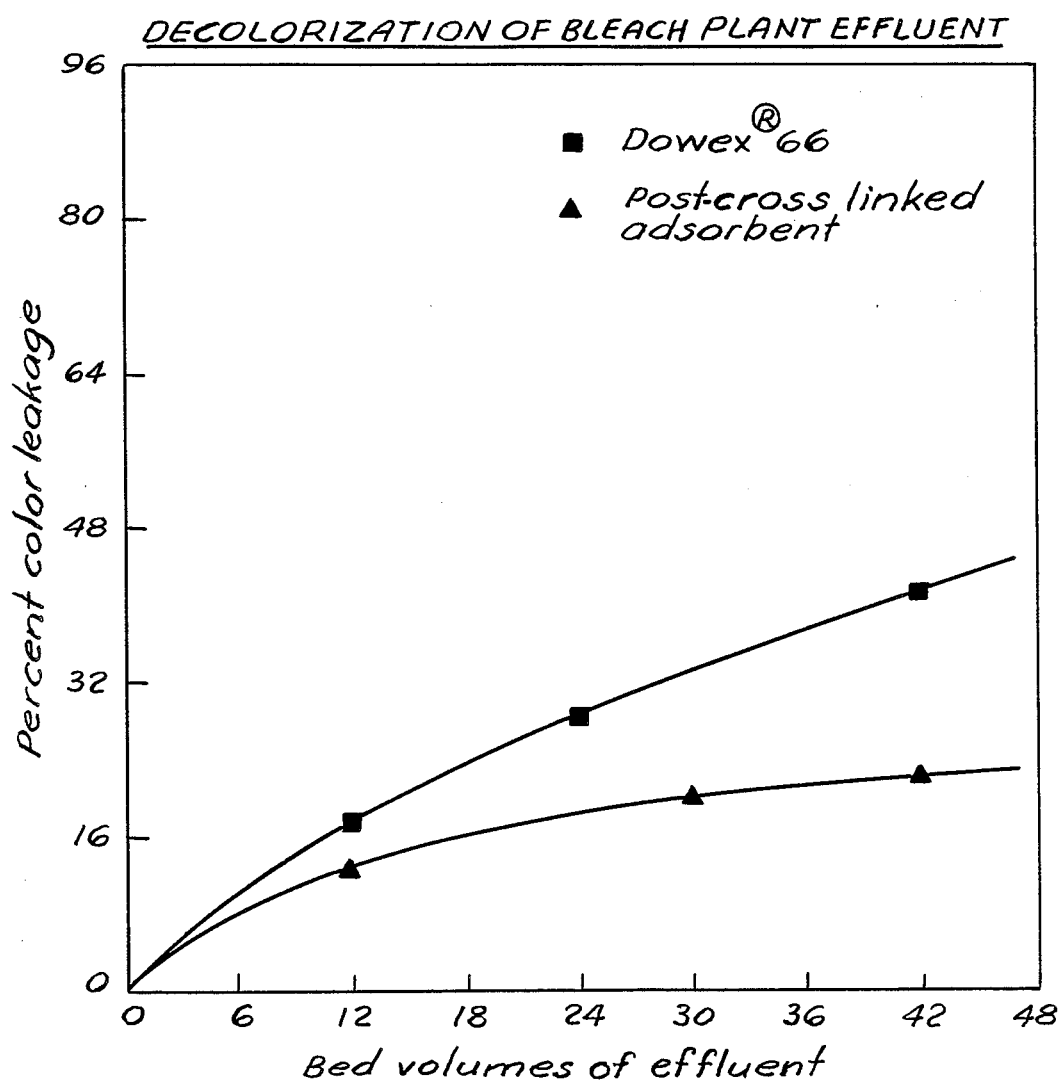
FIG. 2 is a graph illustrating the capacity of an adsorbent resin of this invention for decolorizing a waste effluent from a pulp mill bleach plant relative to the capacity of a conventional anion-exchange resin.

The adsorptive capacity of the adsorbent resin is measured by pumping the waste effluent from a pulp mill bleach plant at a pH of 4.5 through 5 cc of the resin in the HCl form in a 1 cm×5 cm glass column at 6 bed volumes per hour at 50° C. The concentration of chlorinated phenols or chlorinated guaiacols in the effluent exiting the column is continuously monitored by a UV spectrophotometer at 240 $\mu$m. This concentration is divided by the concentration of chlorinated phenols and chlorinated guaiacols in the effluent entering the column to determine the percent chlorinated phenolic leakage. The concentration of color bodies in the effluent exiting the column is continuously monitored by a UV Spectrophotomer at 380 μm. This concentration is also divided by the concentration of color bodies in the effluent entering the column to determine the percent color leakage. FIGS. 1 and 2 plot a comparison of the percent chlorinated phenolic leakage and the percent color leakage, respectively, for each adsorbent resin and for a conventional weak-base anion-exchange resin. The conventional resin is prepared by aminating a macroporous, chloromethylated copolymer of styrene and divinylbenzene with dimethylamine, sold commercially by The Dow Chemical Company under the trademark DOWEX TM 66.

The results indicate increased adsorptive capacity for the adsorbent resin of this invention relative to conventional weak-base anion-exchange resins.

What is claimed is:

1. A process for purifying a waste effluent from the bleaching of wood pulp comprising the step of contacting a waste effluent with an adsorbent resin so as to adsorb color bodies or chlorinated organic compounds onto said adsorbent resin, wherein said adsorbent resin is derived from a macroporous copolymer of a monovinyl aromatic monomer and a crosslinking monomer, were the macroporous copolymer has been post-crosslinked in the swollen state in the presence of a Friedel-Crafts catalyst and functionalized with hydrophilic groups.

2. The process of claim 1 wherein the crosslinking monomer is a polyvinylidene monomer.

3. The process of claim 2 wherein the polyvinylidene monomer is divinylbenzene, trivinylbenzene or ethylene glycol diacrylate.

4. The process of claim 1 wherein the monovinyl aromatic monomer is styrene or a derivative of styrene, vinyltoluene, vinylbenzyl chloride, or vinylnaphthalene.

5. The process of claim 4 wherein the macroporous copolymer is a copolymer of up to about 99.75 weight percent styrene with the balance consisting of divinylbenzene.

6. The process of claim 1 wherein the macroporous copolymer contains from about 1 to about 45 weight percent of the crosslinking monomer.

7. The process of claim 6 wherein the adsorbent resin contains from about 4 to about 8 weight percent of the crosslinking monomer.

8. The process of claim 7 wherein the adsorbent resin has a porosity from about 0.43 to about 0.58 cc/cc.

9. The process of claim 8 wherein the dry weight capacity of the adsorbent resin ranges from about 0.3 to about 2.0 meq/g.

10. The process of claim 1 wherein the post-crosslinked macroporous copolymer is functionalized with dimethylamine, trimethylamine or dimethylethanolamine.

11. The process of claim 1 wherein the post-crosslinked macroporous copolymer is functionalized by sulfonation.

12. The process of claim 11 wherein the adsorbent resin has a surface area from about 700 to about 1400 $m^2/g$.

13. The process of claim 12 wherein the adsorbent resin exhibits a percent shrink/swell below about 4 percent.

14. The process of claim 1 wherein the post-crosslinked macroporous copolymer is functionalized by solvolysis.

15. The process of claim 1 wherein the adsorbent resin has a surface area from about 150 to about 2100 $m^2/g$.

16. The process of claim 1 wherein the adsorbent resin has a porosity from about 0.10 to about 0.70 cc/cc.

17. The process of claim 1 wherein the adsorbent resin exhibits a percent shrink/swell below about 7 percent.

18. The process of claim 7 wherein the dry weight capacity of the adsorbent resin ranges from about 0.1 to about 4.0 meq/g.

19. The process of claim 1 wherein the waste effluent is contacted with the adsorbent resin continuously in a packed column.

20. The process of claim 1 wherein the residence time for contact between the adsorbent resin and the waste effluent is from about 0.17 hours to about 0.5 hours.

21. The process of claim 1 wherein the amount of adsorbent resin is from about 0.017 to about 0.008 kg/kg aqueous waste effluent.

22. The process of claim 1 wherein the pH of the waste effluent is from about 4 to about 5.

* * * * *

UNITED STATES PATENT AND TRADEMARK OFFICE
CERTIFICATE OF CORRECTION

PATENT NO. : 4,895,662

DATED : January 23, 1990

INVENTOR(S) : Rex R. Stevens

It is certified that error appears in the above-identified patent and that said Letters Patent is hereby corrected as shown below:

On cover page of patent, column 2, under the heading OTHER PUBLICATIONS, "R. e. Anderson." should correctly appear as --R. E. Anderson--;

Column 1, line 42, "fficient" should correctly appear as --efficient--;

Column 2, line 29, "moe" should correctly appear as --more--;

Column 2, line 49, "herrein" should correctly appear as --herein--;

Column 2, line 56, "slvent" should correctly appear as --solvent--;

Column 4, line 35, "Post-croslinking" should correctly appear as --Post-crosslinking--;

Column 4, line 42, "slution" should correctly appear as --solution--;

Column 4, line 44, "functinalized" should correctly appear as --functionalized--;

Column 4, line 65, "amounteffective" should correctly appear as --amount effective--;

Column 5, line 11, "rom" should correctly appear as --from--;

Column 5, line 19, "conentional" should correctly appear as --conventional--;

Column 5, line 54, "greaterthan" should correctly appear as --greater than--;

UNITED STATES PATENT AND TRADEMARK OFFICE
CERTIFICATE OF CORRECTION

PATENT NO. : 4,895,662

DATED : January 23, 1990

INVENTOR(S) : Rex R. Stevens

It is certified that error appears in the above-identified patent and that said Letters Patent is hereby corrected as shown below:

Column 5, line 68, "allos" should correctly appear as --allows--;

Column 6, line 15, "of" should correctly appear as --or--;

Column 6, line 24, "(nl)" should correctly appear as --(ml)--;

Column 8, line 33, Claim 18, "7" should correctly appear as --1--.

Signed and Sealed this

Sixteenth Day of April, 1991

Attest:

HARRY F. MANBECK, JR.

Attesting Officer

Commissioner of Patents and Trademarks